United States Patent [19]
Reynolds et al.

[11] Patent Number: 6,138,161
[45] Date of Patent: Oct. 24, 2000

[54] METHOD AND SYSTEM FOR MAINTAINING RESERVE COMMAND RELATIONSHIPS IN A FIBRE CHANNEL NETWORK

[75] Inventors: Robert A. Reynolds, Pflugerville; Keith M. Arroyo; Stephen K. Wilson, both of Austin, all of Tex.

[73] Assignee: Crossroads Systems, Inc., Austin, Tex.

[21] Appl. No.: 09/251,759

[22] Filed: Feb. 18, 1999

[51] Int. Cl.[7] .......................... G06F 15/16; G06F 15/177; G06F 15/173

[52] U.S. Cl. .......................... 709/227; 709/221; 709/245; 709/242; 370/392

[58] Field of Search .................................. 709/242, 227, 709/221, 250, 237, 245; 370/392

[56] References Cited

U.S. PATENT DOCUMENTS

| | | | |
|---|---|---|---|
| 5,553,241 | 9/1996 | Shirakihara | 709/227 |
| 5,802,258 | 9/1998 | Chen | 714/10 |
| 5,954,796 | 9/1999 | McCarty et al. | 709/222 |
| 6,014,383 | 1/2000 | McCarty | 370/453 |
| 6,041,381 | 3/2000 | Hoese | 710/129 |

OTHER PUBLICATIONS

Perkins, Charles E., "Mobile Networking Through Mobile IP", IEEE Internet Computing, Feb. 1998, pp. 58–69.

Digital Equipment Corporation, "Multipath and Fibre Channel Chapters from Guidelines for OpenVMS Cluster Configurations", www.openvms.digital.com/openvms/fibre/doc/6318pro.html, pp. 1–12, Oct. 1999.

Digital Equipment Corporation, "Multipath and Fibre Channel Chapters from Guidelines for OpenVMS Cluster Configurations, Chapter 2", www.openvms.digital.com/openvms/fibre/doc/6318pro_003.html, pp. 1–17, Oct. 1999.

Primary Examiner—Dung C. Dinh
Assistant Examiner—Bradley Edelman
Attorney, Agent, or Firm—Gray Cary Ware & Freidenrich, LLP

[57] ABSTRACT

A method and system for maintaining a unique reserve command relationship between an initiator and a target device in a Fibre Channel network across network address changes after a break in communication. The present invention maintains triplet tables containing data triplets, comprised of the network address, the port name, and the node name, for each initiator and each target device. Following a break in network communication that results in the network address of an initiator and/or a target device changing, the method of the present invention updates the recorded network addresses for the initiators and the target devices, maintains any previously-existing unique reserve command relationships and continues with I/O transmission. Although the network address of an initiator may change, the node name and port name of the initiator will remain the same. By comparing the initiator port name and node name contained in a reserve table maintained in the target device to the node name and port name corresponding to the now updated network address for an initiator with which it was in a unique reserve command relationship prior to the break in communication, a target device can then simply update the network address for the initiator and no disruption in I/O traffic will result.

32 Claims, 4 Drawing Sheets

METHOD AND SYSTEM FOR MAINTAINING RESERVE COMMAND RELATIONSHIPS IN A FIBRE CHANNEL NETWORK

TECHNICAL FIELD OF THE INVENTION

This invention relates generally to data and information communications systems and their operation, and, more particularly, to communications networks, including a Fibre Channel network. Even more particularly, the present invention relates to a Fibre Channel network system and method of operation having the ability to maintain a unique reserve command relationship between initiator nodes and target nodes across address changes for improving the management of inputs and outputs to improve network performance, eliminate communication failures, and avoid the loss of data that may occur as a result of a network link state change.

BACKGROUND OF THE INVENTION

A "Reserve" SCSI command is used by an initiator in a data and information communications network to reserve a specific target device, or a portion of that target device, for exclusive use by that initiator. Once a target device, or portion of a target device, has been reserved by an initiator, that target device, or portion thereof, cannot be used by any other initiator until it is released by the first initiator. The SCSI target device uses the SCSI address of the initiator that issued the reserve command to identify the initiator with which it is in a unique reserve command relationship. In a Fibre Channel network, the network address is the equivalent of the SCSI address.

In a SCSI-2 environment, the SCSI address is persistent and does not change unless the SCSI node is power cycled. In a Fibre Channel network, the network address assigned to initiators and target devices may be dynamic. Therefore, after a link state change on the network, the network addresses assigned to existing nodes (i.e., initiators or target devices) in the network can change. This behavior creates a problem for SCSI target devices in managing the reserve command behavior in progress between a specific initiator-target device pair across link state changes.

With known methods for managing I/Os in a Fibre Channel network, when an existing I/O is in progress and either an initiator or a target device detects a link state change, the initiator must authenticate that it is still communicating with the same target device before the I/O can continue. This authentication is detailed in the Fibre Channel PLDA (Private Loop Direct Attach) profile. This profile is an extension to the SCSI-3 standard FCP (Fibre Channel Protocol), which defines SCSI implementation over Fibre Channel. The PLDA profile states that after a link state change from a link-down to link-up condition, the initiator must send an ADISC (Address Discovery) or PDISC (Port Discovery) ELS (Extended Link Service) command to every target device with which it has I/Os in progress. The ADISC and PDISC commands are used to exchange node name and port name information. The PLDA profile further requires that if the target device detects that the network address of an initiator has changed, then the target device should terminate the existing I/Os from that initiator. After this step, the initiator performs a recovery process and in some other way restarts the I/O transmission (i.e., communication).

One particular example of an initiator and target device relationship is the reserve command in SCSI. A reserve command allows an initiator to reserve a specific SCSI target device, or a specific portion of a target device, for its exclusive use. The target device reserved is required to maintain that reservation until the same initiator that reserved the target device issues a release command. When an initiator and a target device are in a unique reserve command relationship, they need not be in continuous communication with one another. In other words, it is possible that at any given time an I/O communication could be in progress between the initiator and the target device, or that no I/O communication is in progress. Also, more than one initiator can be in a unique reserve command relationship with a target device at a given time. It is also possible for one initiator to either issue multiple reserve commands to the same target device, thereby reserving multiple discreet portions of that target device, or to issue a single reserve command to a target device to reserve the entire target device. Lastly, multiple initiators can issue multiple reserve commands to reserve specific discreet portions of the same target device. The number of unique reserve command relationships that a target device can have is limited only by the extent to which that target device can be subdivided into discreet reservable portions.

In the event a unique reserve command relationship exists between an initiator and a target device and a link state change occurs, the target device will not be able to tell which initiator reserved it for exclusive use if, as is possible in a Fibre Channel network, the network address has changed.

The termination of a unique reserve command relationship between an initiator and a target device or of I/Os between an initiator and a target device because of a network address change is disruptive. I/Os will not be able to continue in such a case. Such a termination reduces the overall performance of the network because it unnecessarily slows system or network traffic. In some applications, such as where a tape drive serves as the target device for a SCSI initiator, a general application failure may result. Moreover, loss of data results in many instances where this I/O termination process must occur.

In Fibre Channel, initiators talk to target devices using network addresses (PIDs). Each target and each initiator is assigned a PID. In essence, target devices and initiators only know one another in the Fibre Channel network by their network address.

In the event of a link state change, such as when a link goes down and then comes back up, or when a new node is added into the network, the network address of either or both the initiator or target device (or initiators or target devices) can change. An initiator may be, for example, a host personal computer that initiates a SCSI command. A target device may be some type of SCSI device such as a CD-ROM, a tape drive, or other peripheral device. If a link state change occurs in the network while I/Os are in the process of being transmitted, a problem may arise upon the resumption of transmission following the link state change. If a link state change occurs a network address change can result. Because the initiator and target device conventionally only use the network addresses for identification, a confused state can arise in the I/O transmission or reserve command relationship. This confused state could have numerous manifestations, not the least of which would be the generation of corrupted data, lost security, or generally low performance of the network.

The PLDA (private loop direct attach) profile addresses this problem by assigning to each target device and each initiator in a Fibre Channel network loop a unique node name and a unique port name, each of which are represented as 64-bit identifiers. The node name for the initiator or target device defines the node for the particular device, while the port name defines the particular port on the identified node. Note, however, that a given node may possess numerous ports. Accordingly, the port name uniquely identifies the desired port on the given node.

The initiator and target device exchange their respective node names and port names during initial communication, as defined in the FC-PH (Fibre Channel Physical) standard. The node name and port name, when combined with the PID, uniquely identify a device. In the PLDA profile, after a link state change, the initiators send either an ADISC (Address Discovery) or PDISC (Port Discovery) command to each target device with which they were in communication at the time of the link state change. The ADISC or PDISC command communicates between the target device and the initiator, a port name, node name, and PID for identification. The target device and initiator compare the node name, port name, and PID (network address) provided during initial communication to the node name, port name, and PID provided by the JDISC or PDISC command. If they are the same, then the target device and the initiator know that they are the same target device and the same initiator that were communicating with one another both before and after the link state change. If not, then the network addresses have changed and under the PLDA profile, all I/Os between the target device and the initiator are aborted.

According to the PLDA profile, the set of data, including the PID, the node name, and the port name, is called a "triplet." Thus, a triplet in a Fibre Channel network uniquely identifies a network node. In a Fibre Channel network, the PID is the address from which an ADISC or PDISC command is received. The ADISC or PDISC command, therefore, includes the port name and node name within its data payload.

The initiator sends out the ADISC or PDISC command. In response, the target device sends to the initiator an "accept" command, which operates as essentially a "handshake." In addition, the target device sends to the initiator the target device's network address, together with the target device's port name and node name.

The handshaking occurs prior to I/O continuation between the target device and initiator, or the resumption of a unique reserve command relationship, following a link state change. Thus, this form of authentication occurs every time a link goes down and then later comes back up. In fact, authentication occurs continually throughout the communication of I/Os in the Fibre Channel arbitrated loop.

According to the PLDA profile, when I/Os are in progress and a target device's network address (PID) changes, the target is to abort all I/Os. The initiator must perform error recovery on these aborted I/Os. Aborting I/Os in accordance with the authentication process defined by the PLDA profile results in performance problems. In the case of SCSI tape operations, the authentication process may result in application failures, from which the associated host may not be able to recover. That is, in the example of a SCSI tape, it may be impossible for the host to identify the physical location of the tape head or the sequentially-fed tape. Other problems arise from the present method of target authentication following a state change in the Fibre Channel network because the process is, in essence, a catastrophic procedure for addressing a rather common Fibre Channel network occurrence.

In a multi-initiator network, the current standard for PLDA that requires target device authentication following a failure, such as a tape failure, cannot operate. In the event that I/Os are interrupted, all the initiators on the multi-initiator network must take the time and cause the necessary delays associated with the target device authentication process. Accordingly, there is a need for a method and system that addresses the performance limitations arising in the known systems and methods for identifying target devices and initiators following a link state change in a Fibre Channel network loop.

A need exists for a method and system that overcomes the data loss problems occurring in known target authentication methods and systems during a link state change in a Fibre Channel network, such that unique reserve command relationships between an initiator and a target device can be preserved following a link state change.

A further need exists for a method and system that avoids the general application failure that may happen in sequentially operated and other target and initiator devices upon a link state change in a Fibre Channel network while preserving the unique reserve command relationship between a target device and an initiator.

A still further need exists for a method and system that uniquely identifies an initiator to a target device by a method other than the network address, which can be dynamically changing in a Fibre Channel network, so as to preserve unique reserve command relationships existing between a target device and an initiator prior to the link state change.

A still further need exists for a method and system for handling delays in I/Os through a multi-initiator Fibre Channel arbitrated loop network that avoids the need for each initiator to perform the target authentication process upon I/O transmission being restarted following a break in transmission.

SUMMARY OF THE INVENTION

According to the teachings of the present invention, there is provided a method and system for managing I/O transmissions in a Fibre Channel network that maintains unique reserve command relationships between target devices and initiators as well as target device and initiator states across address changes in the Fibre Channel network to eliminate or at least substantially reduce disadvantages and limitations associated with known such systems and methods, including the problems of limited network performance, loss of data in certain applications, and general application failures.

More specifically, the present invention provides a method and system for maintaining a unique reserve command relationship between an initiator and a target device in a Fibre Channel network across network address changes following a break in communication. The method includes the step of maintaining in the initiator a target triplet table comprising a unique target triplet of data for the target device if the initiator is in communication with the target device. An initiator and a target device can be in communication if they are either in a unique reserve command relationship or if they have I/O transmissions in progress. The target triplet of data comprises a target device network address, a target device node name, and a target device port name. The target device may represent a device such as a SCSI router, for example, the Crossroads Systems, Inc. Model 4100. The Fibre Channel network may be a Fibre Channel arbitrated loop or switch network or other network topology.

The next step in the method is to maintain in the target device an initiator triplet table comprising an initiator triplet of data for the initiator if the initiator is in communication with the target device. The initiator triplet of data comprises an initiator network address, an initiator node name, and an initiator port name. The initiator can be a device such as a personal computer on a Fibre Channel network.

A further step in the method is maintaining in the target device a reserve table comprising a pair of data for the initiator if the initiator and the target device are in a unique reserve command relationship. The pair of data comprises the initiator node name and the initiator port name.

The method further includes the step of sending from the initiator to the target device, for the purpose of identifying the initiator to the target device, the initiator triplet of data following the resumption of communication after a break in communication in the Fibre Channel network has occurred, if the initiator and the target are in communication.

If the initiator and the target device are in communication, the method further includes the step of sending from the target device to the initiator the target triplet of data following the resumption of communication after the break in communication for the purpose of identifying the target device to the initiator.

The method further includes the step of comparing the pair of data from the reserve table with the initiator triplet of data sent by the initiator following resumption of communication to identify, based on the initiator node name and the initiator port name, that the initiator and the target device were in a unique reserve command relationship before the break in communication.

In the event that the target device and the initiator were in a unique reserve command relationship before the break in communication, the method further includes the step of continuing the unique reserve command relationship after the break in communication.

The method for maintaining a unique reserve command relationship of the present invention provides the capability for maintaining a plurality of such unique reserve command relationships between a plurality of initiators and one or more of a plurality of target devices in a Fibre Channel network. Furthermore, each of the target devices can be comprised of one or more discreet parts that can be reserved individually by individual initiators. In such a case, the reserve table associated with each individual target device can be a dynamically changing reserve table whose size will vary depending on the number of unique reserve commands issued to that particular target device.

As a technical advantage, the present invention maintains unique reserve command relationships and initiator/target device state information across address changes in a Fibre Channel network. This technical advantage is particularly valuable in the context of a network having more than one initiator. Basically, the initiators and target devices use the node name and port name identifiers to uniquely identify with whom they are communicating. In a Fibre Channel network, the node name and port name are sure to be unique, even though the particular network address of a given target device or initiator is not. In such a network, the situation of continually performing the prior art target authentication process, including the step of restarting all I/Os, can devastate the network performance. This is because in a multi-initiator network environment each individual initiator or target device must separately perform the target device authentication process. This is not needed in networks employing the present invention.

Another technical advantage of the present invention is the capability of providing improved multi-initiator network testing procedures. In such a network, numerous initiators often operate simultaneously or, at least comparatively. In these networks, frequently maintenance of an initiator is needed for some reason or other. Taking down an initiator will generally affect not only the individual initiator, but all initiators on the network, because network addresses change as a result of the removal of the initiator under maintenance. The present invention avoids the need for all initiators to perform the prior art target authentication process in this and similar instances.

Still another technical advantage of the present invention relates to its ability to be made part of a Fibre Channel network with little additional cost. Generally, the method of the present invention may be implemented as a change in the instructions that control the authentication and transfer of triplets in a Fibre Channel network. These changes may be implemented in a hardware protocol chip for controlling the protocol operations within the network. Even this modification may be done with relatively little expense.

Yet another technical advantage of the present invention is the ability to resume unique reserve command relationships and restart I/O transmissions existing prior to a break in communication once it is confirmed that the same target device and the same initiator are in a unique reserve command relationship or are communicating with one another as were communicating prior to the break in communication. Upon performing the authentication to verify the reserve command relationship or communication link, the reserve command relationship or the I/O transmission can resume. There is no need to perform the prior art recovery and restarting for I/O transmission or resumption of a unique reserve command relationship.

Still another technical advantage provided by the present invention arises from the difference of inherent paradigms used for Fibre Channel communications. Most conventional network applications use a SCSI-2 paradigm for I/O transmission. Fibre Channel applications, however, most often use the SCSI-3 paradigm. In the SCSI-3 paradigm, I/O transmission breaks occur frequently as a matter of normal operation. On the other hand, SCSI-2 paradigm operations do not normally use breaks, instead treating them as system or network failure conditions. The present invention avoids the drastic measure of recovery and restarting in response to only I/O transmission breaks. This difference in SCSI-2 and SCSI-3 paradigm operations and the manner in which the method for maintaining a unique reserve command relationship of the present invention addresses these differences even further emphasizes the importance and relevance of its authentication method.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGURES, like numerals being used to refer to like and corresponding parts of various drawings.

The present invention maintains triplets, including the network address, the port name, and the node name for each initiator and each target device in a Fibre Channel network, and upon authentication the desired target device performs a different operation from prior art processes. In the event of a break in network communication, such as a link state change, that results in the network address of the initiator and/or target device changing, instead of performing a recovery or restart process the method of the present invention is to update the network address of, specifically, the initiator, but also of the target device.

The present invention, therefore, maintains any unique reserve command relationships that existed prior to the break in communication between one or more initiators and one or more target devices. Instead of eliminating any previously transmitted I/Os and any existing unique reserve command relationships, the method of the present invention changes the recorded network addresses for the initiators and the target devices, maintains the previously-existing unique reserve command relationships and continues with I/O transmission. The network address change following a break in communication will occur not only in the target triplet held by the initiator, but also in the initiator triplet held by the target. However, the node name and port name of the initiator will remain the same. By comparing the initiator port name and node name contained in a reserve table in the target device to the node name and port name corresponding to the now updated network address for an initiator with which it was in a unique reserve command relationship prior to the break in communication, a target device can then simply update the network address for the initiator and no disruption in I/O traffic will result. The initiator likewise will simply update the network address for the target device with which it was in a unique reserve command relationship prior to the break in communication.

The present invention maintains a table of address/node name/port name triplets for every initiator and every target device in a unique reserve command relationship or having I/Os in progress. This permits maintaining the unique reserve command relationship and I/O even across a network address change for the initiator or target device. With the present invention, the node (either the initiator or the target device) receives the network triplet using ADISC or PDISC commands and determines whether the triplet describes the same node name and port name with which the node was in a unique reserve command relationship, or was converting I/O transmissions with, prior to the I/O transmission break. If so, and only the network address has changed, the method of the present invention is to update the triplet and proceed with the unique reserve command relationship and I/O transmissions.

The target device updates the network address for any initiator whose address has changed and which has reserved either the entirety of the target device or one of n discreet parts (where n equals 1, 2, 3 . . . ) for its exclusive use. The target device compares the port name and node name maintained in its reserve table for each initiator which has reserved a portion of that target device to the initiator triplet received for each such initiator as a result of the ADISC or PDISC commands occurring after the break in communication. If the port name and node name of the initiator triplet received as a result of the ADISC or PDISC command matches the node name and port name maintained in the reserve table by the target device for a given initiator, the target device resumes the previously existing unique reserve command relationship. Such a unique reserve command relationship can exist between an initiator and a discreet portion of the target device, or alternatively, between the initiator and the entire target device. By allowing unique reserve command relationships and I/O transmissions to continue even across network address changes, the present invention significantly improves the robustness of SCSI in a Fibre Channel environment.

Figure 1:
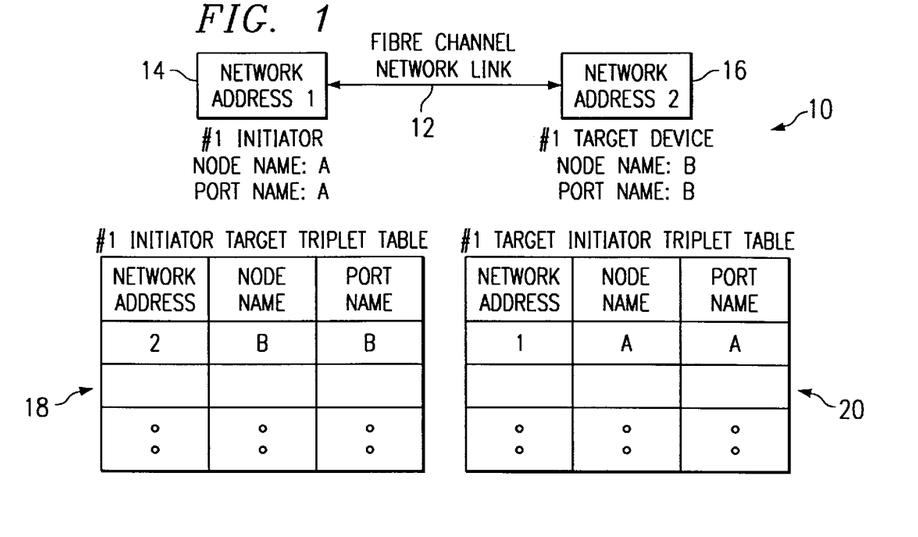
FIG. 1 illustrates a Fibre Channel network for incorporating the method for maintaining a unique reserve command relationship of the present invention.

In FIG. 1 there appears a conceptual diagram 10 for describing a Fibre Channel network that includes network link 12 for connecting #1 initiator 14, which has network address 1, a node here designated as node name "A", and at a port here designated as port name "A". At #1 target device 16, network link 12 connects to a node here designated as node name "B" and at a port here designated as port name "B" and having network address 2.

According to the teachings of the present invention, #1 initiator 14 holds a triplet table, #1 initiator target triplet table 18, for recording the connection from #1 initiator 14 to #1 target device 16. Initiator target triplet table 18 records the connection from #1 initiator 14 to #1 target device 16 as network address "2", node name "B", and port name "B". Similarly, #1 target device 16 holds a triplet table, #1 target initiator triplet table 20, that records the connection from #1 target device 16 to #1 initiator 14 as network address "1," node name "A," and port name "A." Both #1 initiator target triplet table 18 and #1 target initiator triplet table 20 can be dynamic tables, growing or shrinking for a given target device or initiator in response to the number of initiators or target devices communicating with that initiator or target device.

Network link 12 may be any Fibre Channel network connection. When #1 initiator 14 first communicates over network link 12 with #1 target device 16, these two nodes exchange network addresses, node names, and port names, which are stored in #1 initiator target triplet table 18 and #1 target initiator triplet table 20, respectively. #1 initiator 14 and #1 target device 16, will each store the other's triplet data as, for example, a three-field database entry, in their respective triplet table, for as long as I/O transmissions continue between them. These entries will remain valid as long as no break occurs in the I/O transmissions (no break in communication), and as long as no change occurs in the physical address of #1 initiator 14 or #1 target device 16. FIG. 1 demonstrates the portion of the method for maintaining a unique reserve command relationship between an initiator and a target device of the present invention comprising the initial identification of #1 initiator 14 and #1 target device 16 to one another. FIG. 1 does not show a unique reserve command relationship in progress.

Figure 2:
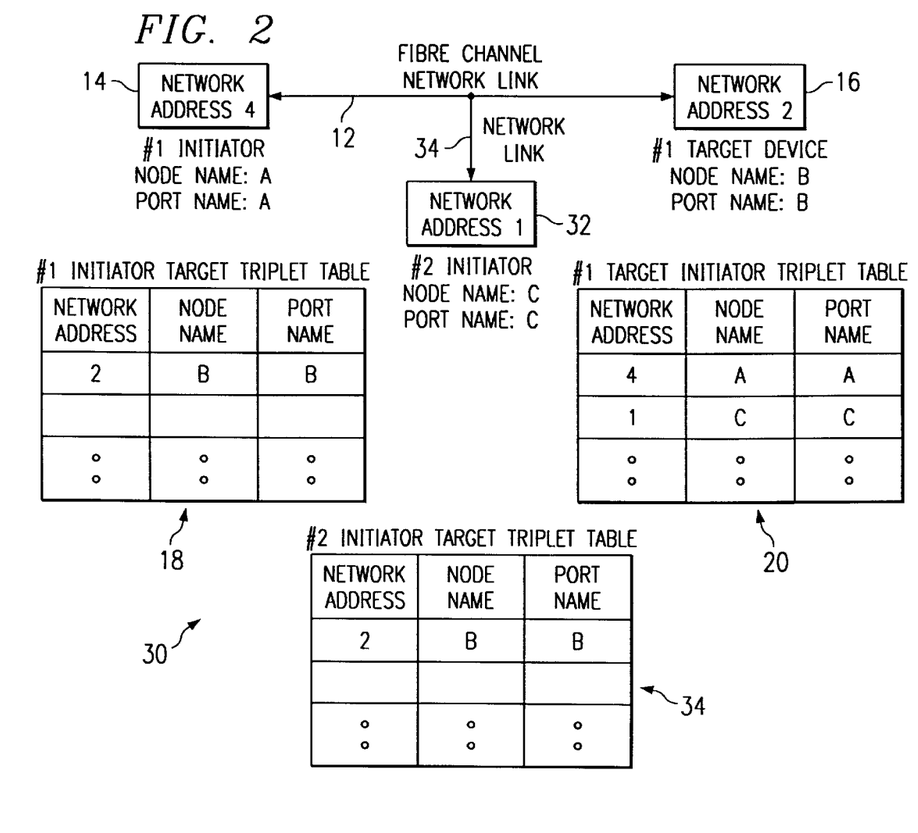
FIG. 2 illustrates the use of the present invention in a Fibre Channel network such as that appearing in FIG. 1.

FIG. 2 shows a modified Fibre Channel network 30 demonstrating the capability of the present invention to update network address changes occurring at different nodes in the network following either a break in communication or other event resulting in a network address change. Fibre Channel network 30 of FIG. 2 does not show any unique reserve command relationships in progress, but rather only shows communications in the form of I/O transmissions occurring between #1 initiator 14, #2 initiator 32, and #1 target device 16. #2 initiator 32 connects to Fibre Channel network link 12 via network link 34. Contrasting with FIG. 1, #2 initiator 32 now occupies network address "1" and communicates with #1 target device 16. #1 initiator 14 now occupies network address "4." #1 target device 16 has not changed its physical address in this instance. This change from network address "1" to network address "4" for #1 initiator 14 may occur, for example, due to the operation of the Fibre Channel addressing scheme or due to a break in communications such as a link state change.

To reflect this change, the present invention simply updates the changed physical address, as #1 target initiator triplet table 20 indicates. Thus, #1 initiator 14 authenticates #1 target device 16 to determine that the network address for #1 target device 16 has not changed. Accordingly, #1 initiator target triplet table 18 will not change relative to #1 initiator 14. Since #2 initiator node 32 now occupies network address "1," instead of #1 initiator node 14 (which now occupies network address "4"), #1 target initiator triplet table 20 requires appropriate updating as FIG. 2 shows. This aspect of the method of the present invention is possible because each of #1 initiator 14, #2 initiator 32, and #1 target device 16 maintain these respective triplet tables. Thus, although the address for #1 initiator 14 has changed, #1 target device 16 knows that it was communicating with a node having node name "A" and port name "A," and #1 initiator 14 knows it was communicating with #1 target device 16 at network address "2," node name "B," and port name "B."

Upon the initiation of I/O transmissions following the addition of #2 initiator 32, #1 target device 16 updates #1 target initiator triplet table 20 to add network address "1," node name "C," and port name "C." #2 initiator 32 adds to #2 initiator target triplet table network address "2," node name "B," and port name "B" corresponding to #1 target device 16. With these data entries into the respective triplet tables, I/O transmissions may continue until some break or interrupt occurs, at which point their being stored in the associated node makes it possible to perform the operations of the present invention. Network address changes for an initiator or target device such as #1 initiator 14 and #1 target device 16 can occur, for example, due to a break in communication or due to the addition of one or more initiators or target devices.

Note that all devices, including the FIG. 2 example #1 initiator 14, #2 initiator 32, and #1 target device 16, maintain a triplet record for each device with which I/O transmissions occur (i.e., with which they are in communication). This permits the more rapid authentication that the present invention achieves following the resumption of I/O transmissions after a break in communications. Thus, for example, #1 initiator 14 may be transmitting I/Os to many more target devices than only #1 target device 16 as shown in FIG. 2.

Figure 3:
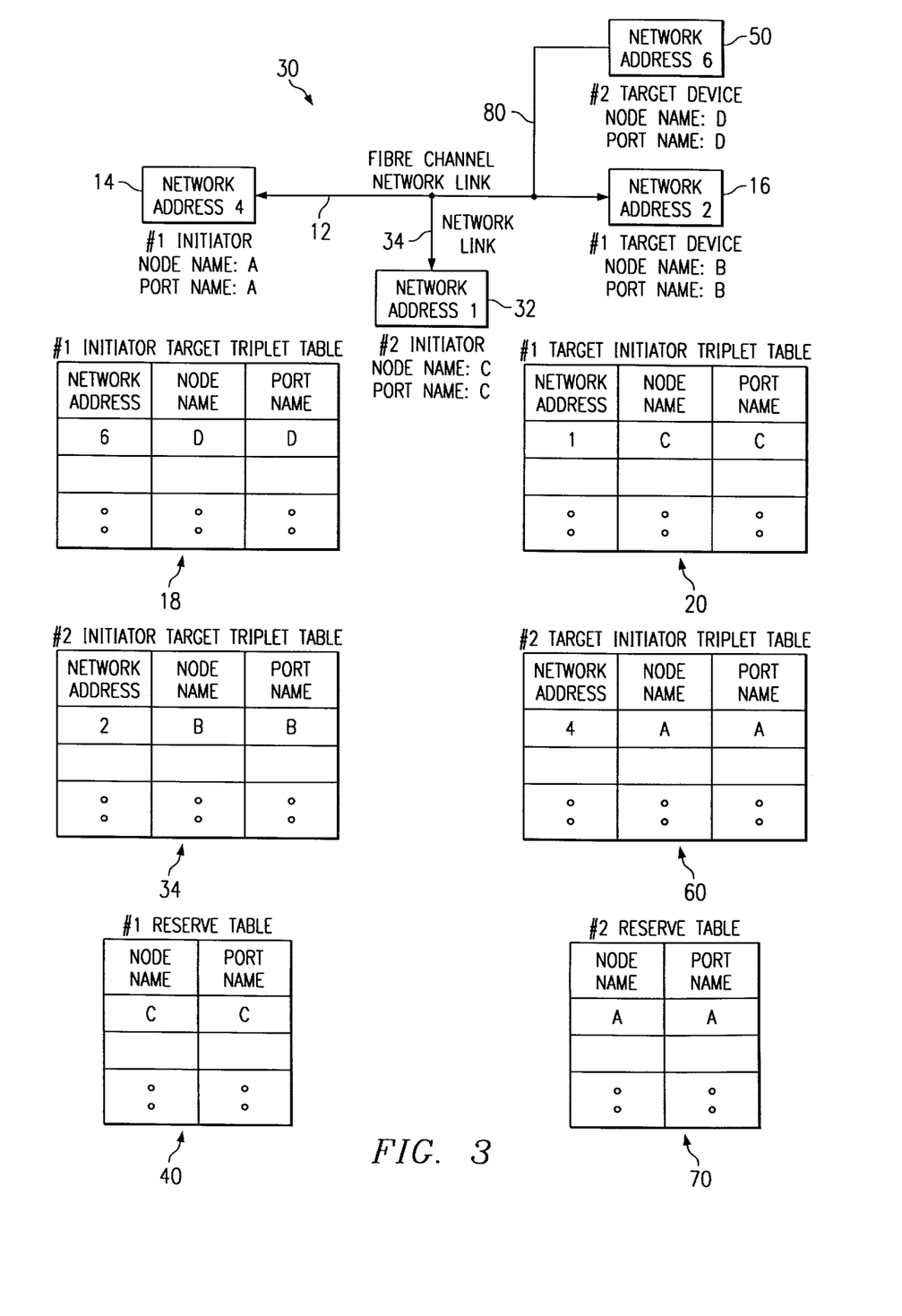
FIGS. 3 and 4 illustrates the use of the present invention in a Fibre Channel network, such as that appearing in FIG. 1, which incorporates multiple targets and multiple initiators.

FIG. 3 illustrates the method of the present invention for maintaining a unique reserve command relationship between initiators and target devices in a Fibre Channel network across network address changes following a break in communication. Fibre Channel network 30 now includes #2 target device 50 and corresponding #2 reserve table 70 and #2 target initiator triplet table 60. #1 target device 16, in addition to #1 target initiator triplet table 20, now also includes #1 target reserve table 40. Network link 80 connects #2 target device 50 to Fibre Channel network link 12. In FIG. 3, #2 target device 50 is in communication (I/O transmissions in progress) with #1 initiator 14. #1 target device 16 is in communication with #2 initiator 32. As described above in reference to FIG. 1, when #1 target device 16 first communicates with #2 initiator 32, and when #2 target device 50 first communicates with #1 initiator 14, each exchanges their respective triplet data with, and each stores the triplet data they receive from, their corresponding partner in communication as, for example, a three-field database entry in their respective triplet tables. In addition, FIG. 3 shows #1 initiator 14 in a unique reserve command relationship with #2 target device 50, reserving, in this instance, the entire #2 target device 50. #2 target device 50 stores this recognition of the unique reserve command from #1 initiator 14 as a pair of data in #2 reserve table 70 comprising the initiator node name and initiator port name corresponding to #1 initiator 14. In this case this is node name "A" and port name "A."

Similarly, #1 target device 16 is shown in a unique reserve command relationship with #2 initiator 32. #1 target device 16 maintains #1 target reserve table 40. #1 target reserve table 40 holds the data pair consisting of node name "C" and port name "C" corresponding to the initiator node name and initiator port name for #2 initiator 32.

Figure 4:
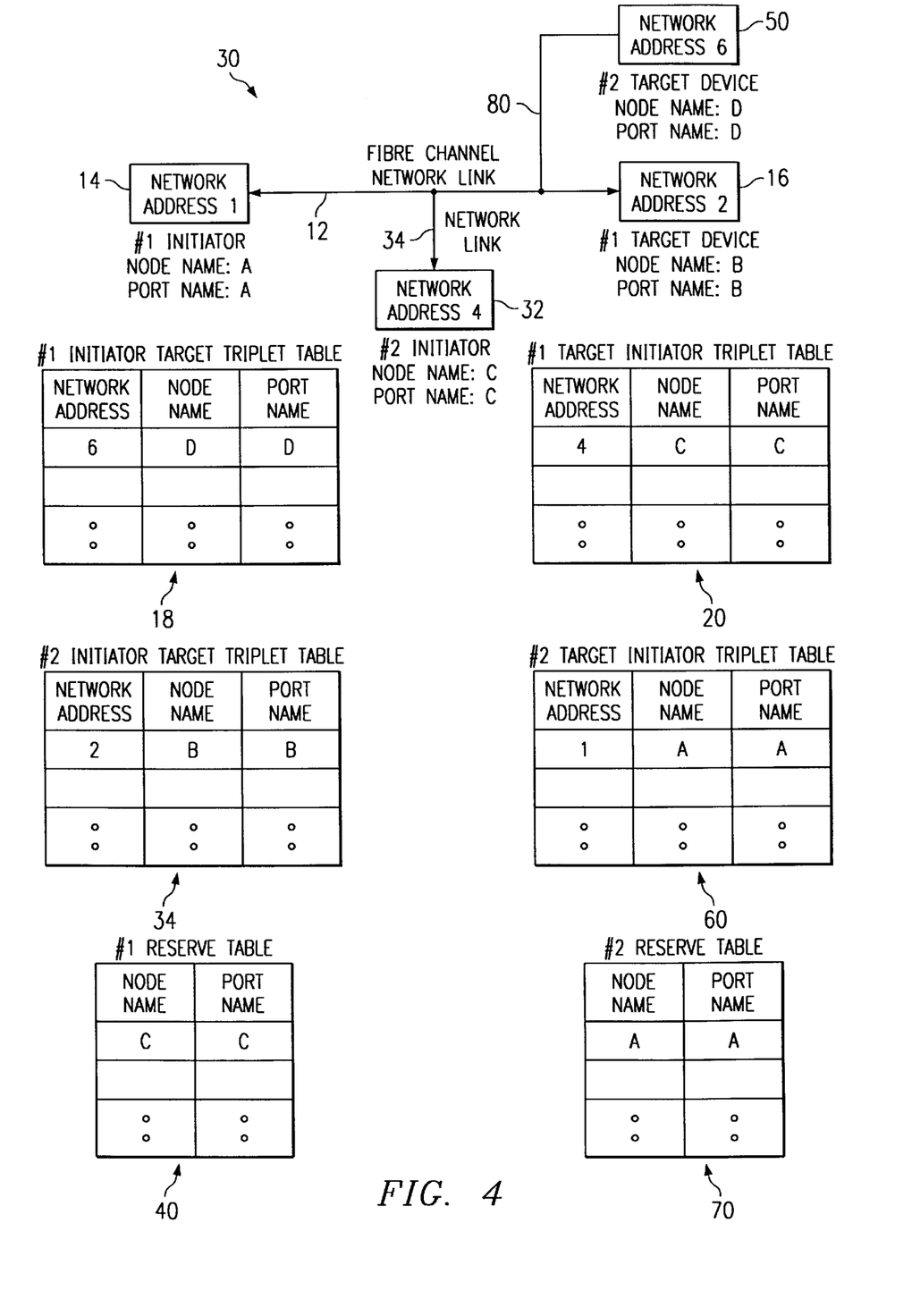

FIG. 4 and FIG. 3 together show the method for maintaining a unique reserve command relationship of this invention in operation. FIG. 4 includes; the same Fibre Channel network 30 of FIG. 3 following a break in communication occurring after the unique reserve command relationships described in FIG. 3 have been established. FIG. 4 is therefore the same Fibre Channel network 30 as shown in FIG. 3, except FIG. 4 shows Fibre Channel network 30 following such a break in communication. As shown in FIG. 4, #1 initiator 14 now occupies network address "1" and #2 initiator 32 now occupies network address "4." This change in network addresses in #1 initiator 14 and #2 initiator 32 may occur, for example, due to the operation of the Fibre Channel addressing scheme, due to a break in communication such as a link state change, or due to the addition of one or more initiators or target devices to the network.

To reflect these address changes, the present invention updates the network addresses of the initiators (as well as, possibly, the target devices) in a manner similar to that discussed with respect to FIGS. 1 and 2 above, as #1 target initiator triplet table 20 indicates. #1 initiator 14 authenticates #2 target device 50 to determine that the network address for #2 target device 50 has not changed. Accordingly, #1 initiator target triplet table 18 will not change relative to #1 initiator 14 because the network address for #2 target device 50 has not changed. Similarly, #2 initiator 32 authenticates #1 target device 16 to determine that the network address for #1 target device 16 has not changed. Accordingly, #2 initiator target triplet table 34 will not change relative to #2 initiator 32. Since #2 initiator 32 now occupies network address "4," instead of #1 initiator 14, which now occupies network address "1," #1 target initiator triplet table 20 requires appropriate updating, as FIG. 4 shows. Similarly, #2 target initiator triplet table 60 requires updating to account for the change in network address of #1 initiator 14. These updates are accomplished using the ADISC and PDISC commands as previously discussed. FIG. 4 shows both these updates already accomplished.

The method for maintaining unique reserve command relationships between initiators and target devices of the present invention calls for a comparison between the initiator node names and port names received from using the ADISC or PDISC command, and now stored in #1 and #2 target initiator triplet tables 20 and 60, with the node names and port names stored in corresponding #1 reserve table 40 and #2 reserve table 70. Following a break in communication and the authentication process which results in updating of any target triplets of data (i.e., network addresses) that have changed, each of #1 target device 16 and #2 target device 50 will perform the method of this invention to determine if they were engaged in a unique reserve command relationship with one or more initiators in the Fibre Channel network. Although FIG. 4 only shows the network addresses of #1 and #2 initiators 16 and 32 changing, the network addresses of #1 and #2 target devices 16 and 50 may change as well.

2 target device 50 compares the updated triplet of data in #2 target initiator triplet table 60, which in the case shown in FIG. 4 corresponds to an entry for #1 initiator node 14, to the pair of data stored in #2 reserve table 70. If the initiator port name and initiator node name stored for #1 initiator 14 in #2 target initiator triplet table 60 matches the port name and node name stored in #2 reserve table 70 (which indicates which initiator, if any, was/is in a unique reserve command relationship with #2 target device 50), then #2 target device 50 knows (i.e., authenticates) that whatever initiator (in this case #1 initiator 14) has port name "A" and node name "A" is the initiator with which it was in a unique reserve command relationship prior to the break in communication (or other cause of a network address change). Having updated corresponding #2 target initiator triplet table 60, and having compared the updated entries in #2 target initiator triplet table 60 with the entries in #2 reserve table 70, #2 target device 50 knows that the initiator in the Fibre Channel network now occupying network address "1" is the same initiator that prior to the break in communication had occupied network address "4." Therefore, #2 target device 50 knows that the same initiator that previously occupied network address "4" and now occupies network address "1" is the same initiator with which it was in a unique reserve command relationship prior to the break in communication. #1 initiator 14 can now resume that unique reserve command relationship with #2 target device node 50. In a similar fashion, #1 target device 16 resumes its corresponding unique reserve command relationship with #2 initiator 32.

The method for maintaining a unique reserve command relationship following a break in communication of the present invention is possible because each of #1 initiator 14, #2 initiator 32, #1 target device 16, and #2 target device 50 store these respective triplets of information in their respective triplet tables. Thus, although the address for #1 initiator 14 has changed, as shown in FIG. 4, #2 target device 50 knows that it was in a unique reserve command relationship and communicating with an initiator having node name "A" and port name "A." #1 initiator 14 similarly knows that it was communicating with #2 target device 50 at network address "6," node name "D," and port name "D."

Upon the initiation of I/O transmissions following the break in communication, #2 target device 50 updates #2 target initiator triplet table 60 to change network address "4" to network address "1." Similarly, #1 target device 16 updates its #1 target initiator triplet table 20 to change network address "1" corresponding to node name "C" and port name "C," to network address "4," which now corresponds to the same node name "C" and port name "C." With these data entries into the respective triplet tables, I/O transmissions may continue and a comparison can occur between the now updated data entries in the respective triplet tables of #1 target device 16 and #2 target device 50 with the data pairs stored in #1 reserve table 40 and #2 reserve table 70. #1 target device 16 and #2 target device 50 in this way authenticate that the respective initiators with which they are now in communication are the same initiators with which they were in a unique reserve command relationship prior to the break in communication. If so, #1 target device 16 and #2 target device 50 resume their respective unique reserve command relationships following the break in communication. Once all authentications, triplet. updates and comparisons have been completed, any unique reserve command relationships and I/O transmissions that existed before the break in communication may continue until some future break or interrupt occurs, at which point their being stored in the associated triplet tables makes it possible to perform the operations of the present invention.

Note that all devices, including the FIG. 4 example #1 initiator 14, #2 initiator 32, #1 target device 16 and #2 target device 50, maintain a triplet record for each device with which I/O transmissions occur and also that each target device, including the example #1 target device 16 and #2 target device 50 of FIG. 4, maintain a data pair record in a reserve table for each initiator with which they are in a unique reserve command relationship. This permits the more rapid authentication that the present invention achieves following the resumption of I/O transmissions after a break in communication. Thus, for example, #1 initiator 14 may be transmitting I/Os to many more target devices than only #2 target device 50 and may be in a unique reserve command relationship with more than only #2 target device 50. In fact, #1 initiator can be in more than one unique reserve command relationship with #2 target device 50 itself (or any other target device within the Fibre Channel network).

Figure 5:
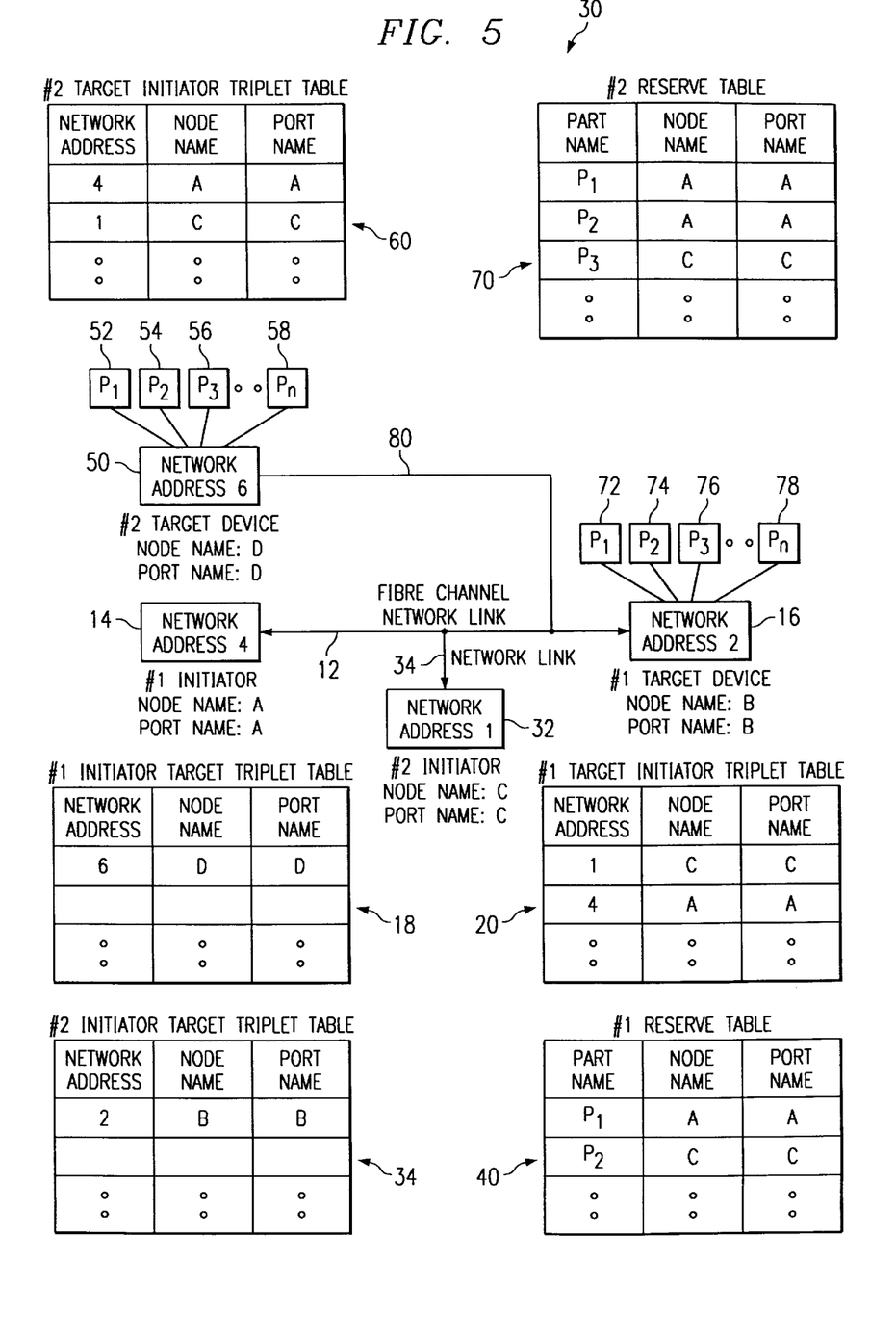
FIG. 5 illustrates the method of the present invention in a Fibre Channel network where each target device is comprised of one or more discreet and independently reservable parts.

FIG. 5 illustrates the capability of the method for maintaining a unique reserve command relationship of the present invention to operate in a Fibre Channel network in which each target device is itself comprised of n (where n equals 1, 2, 3 . . . ) discreet individually reservable parts. FIG. 5 shows the same Fibre Channel network 30 of FIGS. 3 and 4, modified to illustrate how each target device, such as the example #1 target device 16 and #2 target device 50 of FIG. 5, can be comprised of any number of discreet separately reservable parts $P_1$ through $P_n$. The description of FIG. 5 is essentially the same as that of FIGS. 3 and 4, with the exception that FIG. 5 shows the multi-unique reserve command relationship possibility between a single initiator and a single target and also the capability of a single target device to be engaged in a unique reserve command relationship with more than one initiator.

2 target device 50 is shown with discreet separately reservable parts $P_1$ through $P_n$ numbered as 52, 54, 56 and 58, respectively. Similarly, #1 target device 16 is shown with discreet individually reservable parts $P_1$, $P_2$, $P_3$, up to $P_n$, numbered as 72, 74, 76 and 78, respectively. #1 target device 16 is shown in a unique reserve command relationship with both #1 initiator 14 and #2 initiator 32. #1 initiator node 14 is in a unique reserve command relationship with discreet individually reservable part $P_1$ 72 of #1 target device 16. #2 initiator 32 is in a unique reserve command relationship with discreet individually reservable part $P_2$ 74 of #1 target device 16. #1 reserve table 40 is shown with a new third column expanding reserve table 40 to accommodate a three-field database entry, a "reserve triplet", comprising a target part identifier, an initiator node name and an initiator port name. The target part identifier column catalogs and keeps track of which discreet individually reservable part of #1 target device 16 is being reserved by a particular initiator having the corresponding initiator node name and port name entries. Similarly, #2 reserve table 70 is expanded into a three-column, three-field database entry table to keep track of the node names and port names of initiators engaged in unique reserve command relationships with given discreet individually reservable parts of #2 target device 50.

2 target device 50 is in a unique reserve command relationship with both #1 initiator 14 and #2 initiator 32. Furthermore, #2 target device is engaged in two unique reserve command relationships with #1 initiator 14. #1 initiator 14 is engaged in a unique reserve command relationship with discreet individually reservable part $P_1$ 52 of #2 target device 50 and also with discreet individually reservable part $P_2$ 54 of #2 target device 50. In the event of a break in communication such as a link state change or possibly the addition of another initiator or target device to the Fibre Channel network, both #1 initiator 14, #2 initiator 32, #1 target device 16 and #2 target device 50 perform the method for maintaining a unique reserve command relationship of this invention to authenticate the now possibly changed network addresses of either or all of these devices and maintain any unique reserve command relationships and I/O communications existing prior to the break in communication.

In the case shown in FIG. 5, where there are multiple initiators, multiple target devices, and multiple unique reserve command relationships existing between the different initiators as well as multiple unique reserve command relationships between a given initiator and a given target device, the method of the present invention still operates in the manner discussed in conjunction with FIG. 4 (for the situation involving single unique reserve command relationships between a single target device and a single initiator). Discreet individually reservable parts $P_1$ through $P_n$ of #1 target device 16 and #2 target device 50 can be devices such as tape drives, printers, floppy disks, CD-ROMs, or any other device that can be used in conjunction with a Fibre Channel network.

Although the present invention has been described in detail herein with reference to the illustrated embodiments, it should be understood that the description is by way of example only and is not to be construed in a limiting sense. It is to be further understood, therefore, that numerous changes in the details of the embodiment of this invention and additional embodiments of this invention will be apparent to, and may be made by, persons of ordinary skill in the art having reference to this description. It is contemplated that all such changes and additional embodiments are within the spirit and true scope of the invention as claimed below.

What is claimed is:

1. A method for maintaining a unique reserve command relationship between an initiator and a target device in a Fibre Channel network across network address changes, comprising the steps of:

maintaining in the initiator a target triplet table comprising a target triplet of data for the target device if the initiator is communicating with the target device;

maintaining in the target device an initiator triplet table comprising an initiator triplet of data for the initiator if the initiator is communicating with the target device;

maintaining in the target device a reserve table comprising a pair of data for the initiator if the initiator and the target device are in said unique reserve command relationship;

if the initiator and the target device are in communication, sending from the initiator to the target device said initiator triplet of data following the resumption of communication after said break in communication for identifying the initiator to the target device;

if the initiator and the target device are in communication, sending from the target device to the initiator said target triplet of data following the resumption of communication after said break in communication for identifying the target device to the initiator;

comparing said pair of data from said reserve table with the initiator triplet of data sent by the initiator following the resumption of communication to identify, based on said initiator node name and an initiator node name and an initiator port name, that the initiator and the target device were in said unique reserve command relationship before said break in communication; and on the event that the target device and the initiator were in said unique reserve command relationship before said break in communication, continuing said unique reserve command relationship following the break in communication.

2. The method of claim 1, wherein said network address changes occur following a break in communication.

3. The method of claim 2, wherein said break in communication is a link state change.

4. The method of claim 1, wherein said target triplet comprises a target device network address, a target device node name, and a target device port name, said initiator triplet comprises an initiator network address, an initiator node name, and an initiator port name, and said pair of data comprises the initiator node name and the initiator port name.

5. The method of claim 1, wherein the target device is comprised of at least one discrete reservable part and wherein each of the at least one discrete reservable parts is capable of engaging in a said unique reserve command relationship with the initiator as an individual part or in a group with one or more of others of said at least one discrete reservable parts.

6. The method of claim 5, wherein the number of said at least one discrete reservable parts is dynamically changing.

7. The method of claim 6, further comprising the initiator simultaneously engaging in separate said unique reserve command relationships with at least two of said at least one discrete parts.

8. The method of claim 7, wherein the initiator is a plurality of initiators and the target device is a plurality of target devices.

9. The method of claim 8, wherein each of the plurality of initiators is in communication with at least one of the plurality of target devices.

10. The method of claim 8, wherein each of the plurality of target devices is in communication with at least one of the plurality of initiators.

11. The method of claim 8, wherein at least one of the plurality of target devices is in a said unique reserve command relationship with at least one of the plurality of initiators.

12. The method of claim 11, wherein at least one of the plurality of initiators is in a separate said unique reserve command relationship with at least one of said discrete reservable parts and wherein said reserve table is further comprised of a reserve triplet of data for each of the said separate said unique reserve command relationships, wherein said reserve triplet is comprised of a target part identifier, the initiator node name and the initiator port name and wherein the target part identifier is used to identify which of the at least one of said discrete reservable parts was in said separate said unique reserve command relationship with which of the at least one of the plurality of initiators before said break in communication.

13. The method of claim 12, wherein said reserve table is a dynamically changing table whose size for a given one of said plurality of target devices varies based on the number of said unique reserve command relationships established with said given one of said plurality of target devices.

14. The method of claim 1, wherein said maintaining steps, said sending step and said comparing step occur in response to software instructions.

15. The method of claim 1, wherein said continuing step further comprises the step of immediately continuing communication after performing authentication for verifying a communication link between the target device and the initiator which were in said unique reserve command relationship.

16. The method of claim 1, wherein said continuing step further comprises the step of immediately continuing communication without performing a recovery or restart process.

17. The method of claim 1, wherein the target device is a Crossroads model 4100.

18. A system for maintaining a unique reserve command relationship between an initiator and a target device in a Fibre Channel network across network address changes, comprising:

instructions for maintaining in the initiator a target triplet table comprising a target triplet of data for the target device if the initiator is communicating with the target device;

instructions for maintaining in the target device an initiator triplet table comprising an initiator triplet of data for the initiator if the initiator is communicating with the target device;

instructions for maintaining in the target device a reserve table comprising a pair of data for the initiator if the initiator and the target device are in said unique reserve command relationship;

if the initiator and the target device are in communication, instructions for sending from the initiator to the target device said initiator triplet of data following the resumption of communication after said break in communication for identifying the initiator to the target device;

if the initiator and the target device are in communication, instructions for sending from the target device to the initiator said target triplet of data following the resumption of communication after said break in communication for identifying the target device to the initiator;

instructions for comparing said pair of data from said reserve table with the initiator triplet of data sent by the initiator following the resumption of communication to identify, based on an initiator node name and an initiator port name, that the initiator and the target device were in said unique reserve command relationship before said break in communication; and on the event that the target device and the initiator were in said unique reserve command relationship before said break in communication, instructions for continuing said unique reserve command relationship following the break in communication.

19. The system of claim 18, wherein said network address changes occur following a break in communication.

20. The system of claim 19, wherein said break in communication is a link state change.

21. The system of claim 18, wherein said target triplet comprises a target device network address, a target device node name, and a target device port name, said initiator triplet comprises an initiator network address, an initiator node name, and an initiator port name, and said pair of data comprises the initiator node name and the initiator port name.

22. The system of claim 18, wherein the target device is comprised of at least one discrete reservable part and wherein each of the at least one discrete reservable parts is capable of engaging in a said unique reserve command relationship with the initiator as an individual part or in a group with one or more of others of said at least one discrete reservable parts.

23. The system of claim 22, wherein the number of said at least one discrete reservable parts is dynamically changing.

24. The system of claim 23, wherein the initiator is a plurality of initiators and the target device is a plurality of target devices.

25. The system of claim 24, wherein each of the plurality of initiators is in communication with at least one of the plurality of target devices.

26. The system of claim 24, wherein each of the plurality of target devices is in communication with at least one of the plurality of initiators.

27. The system of claim 24, wherein at least one of the plurality of target devices is in a said unique reserve command relationship with at least one of the plurality of initiators.

28. The system of claim 27, wherein at least one of the at least one of the plurality of initiators is in a separate said unique reserve command relationship with at least one of said at least one discrete reservable parts and wherein said reserve table is further comprised of a reserve triplet of data for each of the said separate said unique reserve command relationships, wherein said reserve triplet is comprised of a target part identifier, the initiator node name and the initiator port name and wherein the target part identifier is used to identify which of the at least one of said least one discrete reservable parts was in said separate said unique reserve command relationship with which of the at least one of the plurality of initiators before said break in communication.

29. The system of claim 28, wherein said reserve table is a dynamically changing table whose size for a given one of said plurality of target devices varies based on the number of said unique reserve command relationships established with said given one of said plurality of target devices.

30. The system of claim 18, wherein said instructions for maintaining, said instructions for sending and said instructions for comparing are maintained in software.

31. The system of claim 18, wherein said instructions for continuing further comprise immediately continuing communication after performing authentication for verifying a communication link between the target device and the initiator which were in said unique reserve command relationship.

32. The system of claim 18, wherein said instructions for continuing further comprise immediately continuing communication without performing a recovery or restart process.

* * * * *